United States Patent [19]

Moy et al.

[11] Patent Number: 4,802,627

[45] Date of Patent: Feb. 7, 1989

[54] MODIFIED SPRAY GUNS FOR VAPOROUS AMINE-ASSISTED SPRAY COATINGS AND METHOD THEREFOR

[75] Inventors: Timothy Y. Moy; Jeffery W. Radcliff, both of Dublin, Ohio

[73] Assignee: Ashland Oil, Inc., Ashland, Ky.

[21] Appl. No.: 199,698

[22] Filed: May 27, 1988

Related U.S. Application Data

[62] Division of Ser. No. 930,721, Nov. 13, 1986, Pat. No. 4,771,946.

[51] Int. Cl.$^4$ .......................... B05B 1/24; B05B 15/02
[52] U.S. Cl. ..................................... 239/112; 239/128; 118/302; 427/326
[58] Field of Search ................... 239/106, 112, 113, 3, 239/8, 13, 132, 132.1, 135–137; 427/422, 326; 118/302; 222/146 H, 148

[56] References Cited

U.S. PATENT DOCUMENTS

| | | | |
|---|---|---|---|
| 1,778,551 | 10/1930 | Etnyre | 239/112 |
| 2,827,112 | 3/1958 | Inskeep | 239/132.3 |
| 3,013,730 | 12/1961 | Bok et al. | 239/137 X |
| 3,572,366 | 3/1971 | Wiggins | 239/112 X |
| 3,870,233 | 3/1975 | Wilhelm et al. | 239/112 X |
| 3,873,023 | 3/1975 | Moss et al. | 239/112 X |
| 4,262,848 | 4/1981 | Chabria | 239/112 |
| 4,285,446 | 8/1981 | Rapp et al. | 239/112 X |
| 4,517,222 | 5/1985 | Blegen | 427/426 X |

Primary Examiner—Andres Kashnikow
Assistant Examiner—Kevin P. Weldon
Attorney, Agent, or Firm—Mueller and Smith

[57] ABSTRACT

Disclosed are modified spray guns, particularly electrostatic spray guns, for implementation of the vaporous amine catalyst spray method disclosed in U.S. Pat. No. 4,517,222. In particular, the present invention broadly is directed to a spray gun for spraying atomized liquid, e.g. vapor permeation curable paint, with the assistance of a vaporous amine flow via an amine flow path established in the spray gun wherein the improvement comprises a control apparatus actuable in the absence of the vaporous amine flow to cause a heated non-amine gas, preferably heated air, to flow through and purge the amine flow path within the gun for maintaining a desired flow path temperature adequate for suppressing amine condensation in the flow path. The spray gun can be a hand spray gun or an automated spray gun utilizing air atomization or mechanical atomization, operating under electrostatic spray conditions if desired. Specific techniques for implementing the purge air technique of the present invention adaptable for a variety of conventional spray guns are disclosed in detail.

5 Claims, 3 Drawing Sheets

MODIFIED SPRAY GUNS FOR VAPOROUS AMINE-ASSISTED SPRAY COATINGS AND METHOD THEREFOR

This application is a division of application Ser. No. 930,721, filed on Nov. 13, 1986, now U.S. Pat. No. 4,771,946.

BACKGROUND OF THE INVENTION

The present invention relates to vapor permeation curable coatings and more particularly to the spray guns and allied equipment used therefor.

Vapor permeation curable coating traditionally are a class of coatings formulated from aromatic hydroxyl-functional polymers and polyisocyanate cross-linking agents wherein an applied film thereof is cured by exposure to a vaporous tertiary amine catalyst. Originally, in order to contain and handle the vaporous tertiary amine catalyst economically and safely, curing chambers were developed. Curing chambers typically are substantially empty boxes through which a conveyor bearing the coated substrate passes and in which the vaporous tertiary amine, normally borne by an inert gas carrier, contacts such coated substrate.

Such traditional vapor permeation curable coatings requirements have been altered by the vaporous amine catalyst spray method disclosed by Blegen in U.S. Pat. No. 4,517,222. Such vaporous catalyst spray method relies on the concurrent generation of an atomizate of a coating composition and a carrier gas bearing a catalytic amount of a vaporous tertiary amine catalyst. Such generating atomizate and vaporous catalytic amine-bearing carrier gas flow are admixed and directed onto a substrate to form a film thereof. Curing is rapid even at room temperature and the use of a curing chamber is not required.

The vaporous spray catalyst method necessarily employs a variety of spray guns and allied equipment therefor. Such spray guns can be hand operated or can be automated for robotic implementation thereof. Additionally, the vaporous spray catalyst method quite readily has been adapted to both conventional air atomizing and air-assisted spray guns as well as electrostatic spray guns. Despite the universal application of the vaporous spray catalyst method, certain problems have developed in adapting such technology to existing commerical coatings lines. One problem is that when the spray gun is not in constant use, the temperature of the gun will equilibrate to the ambient temperature. When the "cold" spray gun then is activated, the vaporous amine in the vaporous amine gas flow can condense within the amine spray path within the gun and especially at the spray cap within the gun. Such amine condensation then can be carried with the atomized paint flow and can cause spotting on the substrate being coated. In electrostatic spray guns, and especially when the vaporous amine line to the electrostatic spray gun is not properly insulated, a path of liquid amine droplets can form from the air cap of the spray gun down through the line towards the vaporous amine generator. If the electrical path to the electrostatic or corona-inducing needle is not adequately insulated from the vaporous amine gas flow, then an electrostatic charge can be conducted down the liquid amine path which results in the safety mechanism within the electrostatic spray gun system shutting off the gun, otherwise the electrostatic charge keeps draining away. On an automated assembly line, it will be appreciated that such an occurrence results in unacceptable down time of the assembly line.

While some conventional spray guns have adequate provision for sealing the electrical line path from the vaporous amine gas path, many conventional spray guns are not so-designed since conventional technology employs only air in such lines so that condensation of an electrical carrier is not a problem confronted by spray gun manufacturers. The present invention is addressed to the foregoing concerns which have arisen in implementation of the vaporous spray catalyst method as disclosed in the '222 patent cited above.

BROAD STATEMENT OF THE INVENTION

The present invention broadly has applicability to any spray gun which is adapted for use in the vaporous spray catalyst method. In particular, the present invention broadly is directed to a spray gun for spraying atomized liquid with the assistance of a vaporous amine flow via an amine flow path established in said gun. The improvement of the present invention comprises means actuable in the absence of said vaporous amine flow to cause a heated non-amine gas, preferably air, to flow through and purge the amine flow path within the gun for maintaining a desired flow path temperature adequate for suppressing amine condensation in said flow path. The spray gun can be a hand spray gun, an automated spray gun, an air atomizing spray gun, an air-assisted airless spray gun, an electrostatic spray gun, or any variation thereof.

One embodiment of the present invention is adapted for a spray gun, which can be an electrostatic spray gun, of the type having a pneumatic line connected to gun actuation means wherein gas flows in said pneumatic line only when said spray gun is spraying. This embodiment of the present invention comprises two-way pilot actuated valve means interposed in the line supplying the vaporous amine flow to the gun wherein the pneumatic line is the pilot therefor whereby said pilot valve means is open only when said spray line has gas flow therethrough. Pressure regulator means are established in the vaporous amine line prior to said pilot valve means to establish a pressure, $P_a$, of vaporous amine flow in said amine line. A heated gas flow line having pressure regulator means for establishing a pressure, $P_p$, means for heating said gas flow, and unidirectional gas flow valve means immediately prior to said heated gas flow line connection to said vaporous amine line after said pilot valve means are established and adjusted so that $P_a$ is set above $P_p$. Such arrangement is effective for permitting the heated gas flow purge to flow through the amine gas flow line when the gun is not in operation for maintaining the desired flow path temperature adequate for suppressing amine condensation in the flow path in the gun.

In another embodiment of the present invention wherein the gun is actuated by non-penumatic means, e.g. hand operated, electrically operated, or the like, the present invention comprises pressure regulation means followed by unidirectional flow valve means interposed in the amine line connected to the spray gun. Adjustable reference pressure sensing control means are connected with the amine line after said amine line pressure regulation means to sense the pressure in the amine line. Pressure regulation means are disposed in a control gas flow line which line is connected with said sensing control means as the reference pressure and which control gas flow is withdrawn from said sensing control means so long as the reference pressure in said amine line is greater than the pressure in the control gas flow into said sensing control means. Two-way pilot actuated valve means is interposed in a heated gas flow line which is at a pressure greater than the pressure in said amine line. The control gas flow is withdrawn from the sensing control means and is the pilot therefor whereby said pilot valve means is open only wnen said pilot control gas flow has gas flow therethrough. Unidirectional gas flow means is interposed in the heated gas flow line which runs from said pilot valve means to the amine line at a point after said amine line unidirectional flow valve means. The control gas pressure regulation means is adjusted so that the control gas pressure is greater than the pressure in said amine line when the gun is spraying and there is flow therein, but the control gas pressure is less than the pressure in said amine line when the spray gun is idle and the pressure in said amine line increases because there is no gas flow therein. The gun is modified so that a minor purge gas flow passes therethrough when said gun is idle, i.e. not spraying.

Another embodiment of the present invention is directed to a spray gun which is known as an air-assisted airless electrostatic spray gun wherein the atomized liquid is atomized with the assistance of a vaporous amine atomizing flow in an amine flow path in the gun and with the assistance of a fan gas flow via a gas flow path in the gun. This embodiment of the present invention comprises means actuatable in the absence of said vaporous amine flow to cause a heated non-amine purge gas to flow through and purge one or both of said amine flow path or said gas flow path for maintaining a desired flow path temperature adequate for suppressing amine condensation in said amine flow path in said gun.

Advantages of the present invention include the ability to virtually eliminate vaporous amine from condensing in the spray gun when the spray gun is idle. Another advantage is that the ability to maintain the spray gun warm for suppressing amine condensation is accomplished economically and efficiently without the need or expensive automated control equipment. Another advantage is that the invention can be readily adapted to conventional spray coatings lines. Yet another advantage is the adaptation of the invention to virtually any spray gun be it conventional air atomized, electrostatic, air-assisted airless electrostatic, or any combination thereof. These and other advantages will be readily apparent to those skilled in the art based upon the disclosure containing herein.

The drawings will be described in detail in connection with the description of the invention which follows.

DETAILED DESCRIPTION OF THE INVENTION

Figure 1:
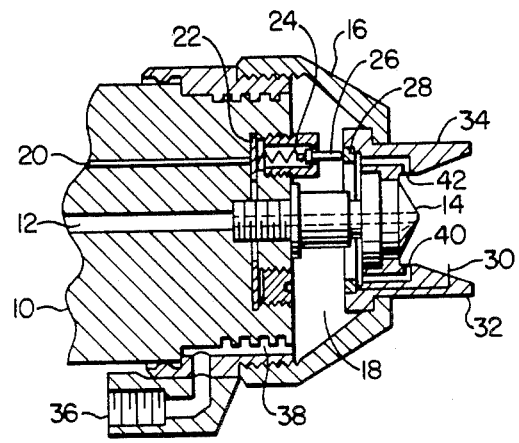
FIG. 1 is a partial cross-sectional view through the air cap and spray end of a conventional air-assisted airless electrostatic spray gun.

The problems which can be encountered in adapting the vaporous spray catalyst method to electrostatic spray gun use can be appreciated by referring to FIG. 1 which is a partial cross-section elevational view of the air cap and end assembly of an electrostatic spray gun such as disclosed in U.S. Pats. Nos. 3,907,202 and 4,055,300. Body 10 of the spray gun has central passage 12 through which the paint is hydrostatically delivered through nozzle 14 of air cap assembly 16. Air cap assembly 16 is screwed onto the end of body 10 to form annular chamber 18 therein. Electrical line 20 runs through body 10 to annular electrical ring 22. Cap 16 bears springbiased electrical connector assembly 24 which contacts electrical connector ring 22 regardless of the position at which cap 16 ultimately is positioned when screwed onto the end of body 10. Electrical connector assembly 24 has protruding contact pin 26 which connects to annular connector ring 28 which also is connected to needle 30. Needle 30 is a corona discharge needle which charges the hydrostatically delivered paint particles as they exit orifice 14. Needle 30 is retained within horn 32, there being opposedly-disposed horn 34 also provided at the end of cap 16.

Gas passageway 36 is in flow communication with manifold 38 which is connection with chamber 18 formed by air cap 16 and body 10. In conventional utilization of the electrostatic spray gun, air is intended to be delivered to the spray gun via line 36. In accordance with the vaporous spray catalyst method, line 36 is fed with a vaporous tertiary amine gas flow, normally containing a carrier gas. It will be observed that the vaporous catalytic mine in chamber 18 can contact electrical contact pin 26 directly. While such contact passes no substantial threat to the operation of the spray gun when air is delivered into chamber 18, problems can develop when amine condenses within chamber 18. Completing the amine flow path within the spray gun, passageway 40 disposed in horn 32 and passageway 42 disposed within horn 34 are in flow communication with chamber 18 and deliver the vaporous catalytic amine for contact with the atomized liquid particles exiting orifice 14. The flow exiting passageways 40 and 42 normally are called the fan air or shroud air in conventional use of the air-assisted airless electrostatic spray gun. It is such fan or shroud air delivery systems which now bear the vaporous catalytic amine.

It will be appreciated that when the initial flow of vaporous catalytic amine enters chamber 18 after a period of non-use of the spray gun, i.e. an idle condition of the spray gun, amine can condense on the colder surfaces which form chamber 18. Such liquid amine condensate can be carried out of passageways 40 and 42 causing dripping problems from the nozzle of the spray gun as well as forming surface imperfections on the substrate being coated. Moreover, if the liquid amine is in sufficient quantity to run back down the amine line via line 36, a direct electrical path for shorting out or voltage reduction of the spray gun has been established. The present invention addresses such amine condensation phenomena by providing means actuable in the absence of vaporous amine flow in line 36 and through the amine flow path established within the spray gun wherein such means causes a heated non-amine gas (preferably heated air) to flow through and purge the amine flow path for maintaining the amine flow path at a desired temperature for suppressing amine condensation in the flow path. When the operator commences actuation of the idle gun, passageway 35, manifold 38, chamber 18, and passageways 40 and 42 will be at a sufficiently warm temperature so that the incoming vaporous amine will not condense. Should any condensation occur during use of the gun, however, when the gun becomes idle, the heated gas flow again will purge the amine flow path for vaporizing any amine condensate collected therein.

In terms of temperature, flow rate, and time, the purge flow is adequate to vaporize any amine condensate in the amine flow path and suppress amine from condensing when the idle gun is first put into use. The appropriate temperature to focus on, then, is the amine flow path temperature which should be adequate to vaporize any amine condensate thereon. Practically speaking, the amine flow path temperature should be established between about 50° and 65° C., depending on the particular amine used. Since the flow rate and time of the purge are variables, the purge flow temperature typically can range from about 30° to 95° C. and preferably from about 50° to 82° C. Flow rates typically can range from about 1-4 liters per second, though this range can vary significantly as those skilled in the art will appreciate. Then, also, the time of the purge, in addition to the purge flow rate and purge flow temperature, is a variable which can be used in designing the system. It will be appreciated that higher air flows mean that lower temperatures can be used and that higher purge flow temperatures mean that a lower flow rate can be used. For that matter, the purge may be intermittent, rather than continuous in order to accomplish the vaporization of any amine condensate and maintenance of desired flow path temperature.

In automated assembly lines wherein robotically-controlled spray guns are disposed, a variety of means of actuation of the spray gun are possible. One prevelant technique employs a pneumatic line for actuating the spray gun. Pneumatic lines also can be used to a drive a generator disposed within the spray gun for creating the voltage or stepping up low voltage fed to the spray gun to a sufficiently high potential for use in some types of spray guns (e.g. the gun of FIGS. 5-7) in electrostatic spraying. One embodiment of the present invention for controlling a pneumatically-actuated spray gun, whether electrostatic or otherwise, is set forth at FIG. 2. Spray gun 50 is fed by paint line 52 and can be an electrostatic spray gun, such as described in connection with FIG. 1, or can be a conventional air-atomized spray gun. Regardless of the particular design of the spray gun, pneumatic line 54 is connected to spray gun 50 for actuating the spray gun by permitting air or other gas to flow therethrough. In accordance with the vaporous spray catalyst technique, amine generator 56 (e.g. as disclosed in U.S. Pat. No. 4,540,531) provides a flow of gas-borne vaporous tertiary amine catalyst via line 58 through pressure regulator 60 and via line 62 into two-way pilot actuated valve means 64. Pneumatic line 54 acts as the pilot for pilot actuated valve 64 which operates in conventional fashion to permit vaporous amine flow in line 62 to pass therethrough and be withdrawn via line 66 so long as gas is flowing in the trigger line, i.e. pneumatic line 54. A suitable pilot actuated valve for use in the present invention includes PR-2 valve supplied by Kremlin, Incorporated (Addison, Illinois). Further on pilot actuated valves can be found, for example, In Chapter 22 of *Chemical Engineers' Handbook*, Perry and Chilton Editors, Fifth Edition, McGraw-Hill Book Company (New York, New York, 1973). It will be appreciated that the hook-up of pilot actuated valve 64 means that the amine gas flow will be contemporaneous with gas flow in pneumatic line 54, i.e. amine will flow when the gun is being actuated and will cease when the gun is idle.

The purge gas scheme commences with line 68 which provides air or other purge gas to flow via pressure regulator 70 and thence via line 72 through heating means 74 which can be any suitable direct or indirect heating means including electrical heating, steam heating, or the like. The heated pilot gas flow is withdrawn from heating means 74 via line 76 and passed through unidirectional valve means 78 which suitably can be check or other one-way flow valve. The heated purge gas then is passed via line 80 into amine gas flow line 66. Pressure regulators 60 and 70 are adjusted so that the pressure of the amine gas fow, $P_a$, is set above the pressure of the pilot gas flow, $P_p$. This pressure differential is needed so that when pilot actuated valve 64 is in its normal operating or open configuration, the amine gas flow will preferentially flow through line 82 into gun 50 rather than the purge air via line 80 into line 82. Unidirectional valve 78 prevents any amine gas flow from flowing backthrough the purge gas flow system.

When gas is flowing via pneumatic line 54, pilot actuated valve 64 is in its normal open position and vaporous tertiary amine gas flow enters gun 50 via line 82. When the flow of gas in pneumatic line 54 is ceased, pilot actuated valve 64 closes which permits purge gas via line 80 to flow into line 82 and thence into gun 50 for heating and purging the amine flow path within the gun, i.e., evaporate any condensed amine therein. The purge gas does not flow back through the vaporous amine lines because pilot actuated valve 64 is in a closed position. Thus, it will be appreciated that an efficient and economic method for purging the spray gun has been provided and is operated based on pneumatic line 54 which controls spray gun 50. It should be appreciated that spray gun 50 is unconventional in the sense that external access to the air cap assembly is provided separate from the pneumatic trigger. Such dual external access capability enables a unique, simplified control circuit to be designed, as described above. Conventional spray guns operating via pneumatic activation essentially have a trigger mechanism similar in operation to pilot actuated valve 64 which mechanism is located within the gun. Such conventional design means that when the pneumatic line activating the gun is shut off, then also the flow of gas through the pneumatic trigger to the air cap assembly is shut off. Thus, a different control circuit design is called for.

Figure 2:
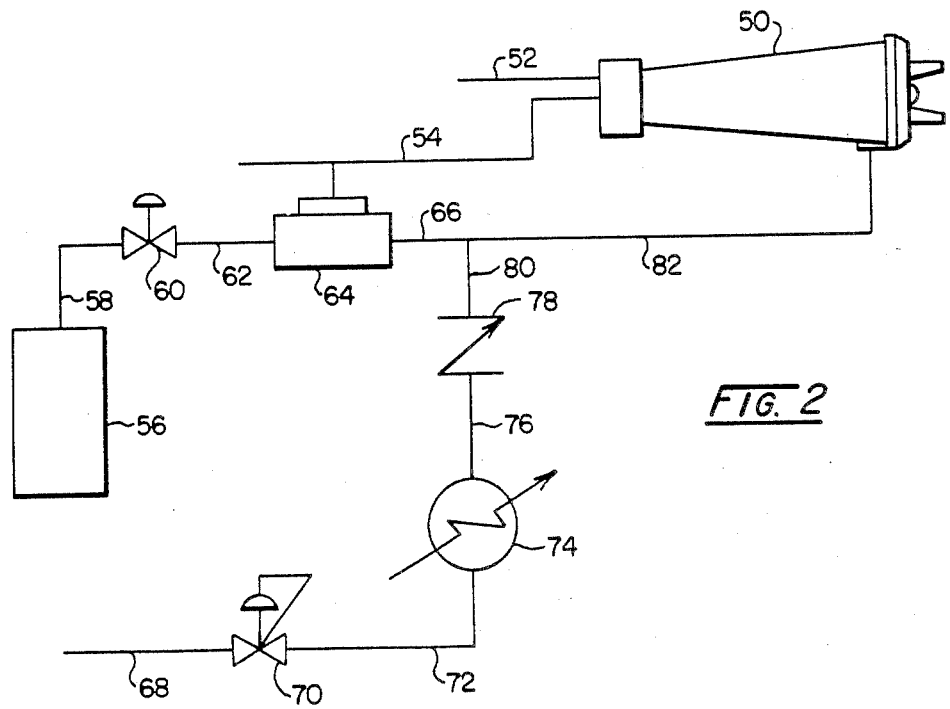
FIG. 2 is a diagrammatic representation of the hot gas purge technique applied to a pneumatically-actuated robotic spray gun.
Figure 3:
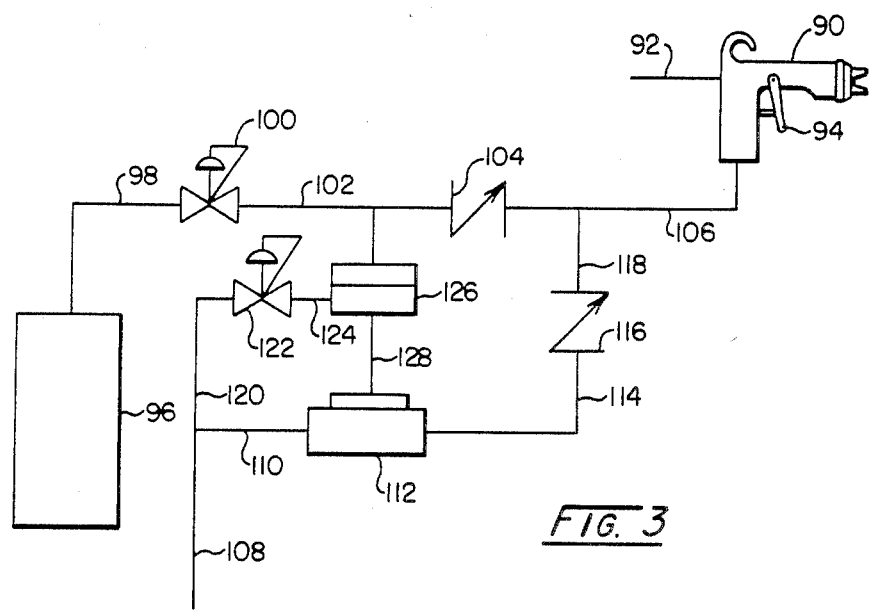
FIG. 3 is a diagrammatic representation of the hot gas purge technique applied to a hand-actuated spray gun.

When the spray gun is not operated via a pneumatic line as described for gun 50, then the system depicted at FIG. 2 cannot be used. Other means of activating a spray gun include hand activation, electrical signal activation, conventional pneumatic activation or the like. In those cases, the purge gas flow system can be implemented as depicted at FIG. 3. Hand operated spray gun 90 is fed paint via line 92 and is actuated via and trigger 94. Vaporous amine gas is generated in vapor generator 96 which conveys the catalytic amine vapors via line 98 through pressure regulation means 100. The vaporous amine flow at pressure $P_a$ is passed via line 102 through unidirectional flow means 104 and thence into line 106 for admission to spray gun 90. When trigger 94 is depressed, vaporous tertiary amine catalyst borne by a carrier gas passes through gun 94 and is delivered at pressure $P_a$. When trigger 94 is released, the pressure in lines 102 and 106 increases above its delivery pressure, $P_A$, since the flow is prohibited from passing out of gun 90. This pressure is referred to as the surge pressure, $P_s$.

The purge gas is heated and is at a pressure $P_p$ by means not shown and then is passed via line 108 into line 110 and two-way pilot actuated valve 112. The purge gas flow is withdrawn from pilot actuated valve 112 via line 114 and passed through unidirectional flow means 116 and thence into line 106 via line 118.

A control gas line is estabilshed by the same purge gas flow from line 108 and is passed via line 120 through pressure regulation means 122 and thence via line 124 into adjustable reference pressure control means 126. It will be appreciated that for economy and efficiency, the control line is established to be the same as the purge gas flow, though a separate control flow can be provided additionally. Adjustable reference pressure sensing control means 126 utilizes the pressure in amine gas flow line 102 as the sensed pressure input and utilizes the gas flow in control line 124 as the adjustable reference pressure. Biasing means within adjustable reference pressure sensing control means 126 will permit or prevent the control gas flow therethrough depending upon the pressure differential established between the sensed pressure in line 102 and the adjustable reference pressure in line 124. The control gas pressure, $P_c$, in line 124 is adjusted via pressure regulation means 122 so that its pressure is greater than the pressure of the vaporous amine gas flow, $P_a$, in line 102 when gun 90 is being utilized and amine flow is being passed via line 106 into gun 90, but is set lower than the surge pressure, $P_s$, which develops in line 102 when trigger 94 is released and the gun is idle, i.e. $P_s > P_c > P_a$. Now, the pressure in the purge gas flow in line 110 is adjusted to be greater than the surge pressure in line 106, i.e. $P_p > P_s$.

The foregoing pressure settings mean that when the sensed vaporous amine pressure is less than the control reference pressure, there is an output from adjustable reference pressure sensing control means 126 via line 128. When the sensed amine pressure rises above the adjustable reference control pressure (i.e., surge pressure), then the output in line 128 ceases. Now, the output in line 128 from adjustable reference pressure sensing control means 126 is the control signal for two-way pilot operated valve means 112. Valve 112 operates such that when a control signal or pressure is sensed in line 128, there is no output flow in line 114. Conversely, when the control signal in line 128 ceases, then the purge flow passes via line 110 through valve 112 and into line 114. Such purge flow will occur when there is no flow or pressure in line 128 which corresponds to a surge pressure in line 102 being greater than the control pressure in line 124. Since the purge pressure in line 110, 114, and 118 is set above the surge pressure in lines 102 and 106, when the gun is idle, the purge flow via line 118 will flow via line 106 into gun 90. A suitable adjustable reference pressure sensing control means for the present invention can be a model 1043 pressure repeater supplied by Clippard Instrument Laboratory, Inc. (Cincinnati, Ohio). While a suitable normally open two-way pilot actuated valve can be a model 2012 valve supplied by Clippard Instrument Laboratory, Inc.

Figure 4:
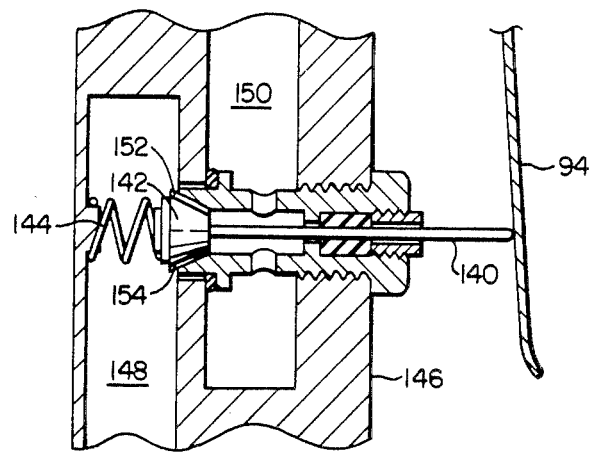
FIG. 4 is a partial cross-sectional elevational view of the hand spray gun of FIG. 3 which spray gun has been modified for implementation of the hot gas purge technique.

Since the gun is idle when the purge flow via line 106 commences, gun 90 must be modified so that the purge flow can flow through the amine path in gun 90 for maintaining the temperature of the flow path at a desired level and for evaporating any amine condensate therein. One simple modification is set forth at FIG. 4 wherein trigger 94 is seen to be connected via rod 140 to stopper 142 which is mounted against biasing means 144. The sealing and remaining construction of the trigger mechanism housed within handle 146 of gun 90 is conventional and is not described in detail herein. Line 106 is in communication with cavity 148 which communicates with cavity 150 via the opening in which stopper 142 is disposed. Cavity 150 is in direct communication with the air cap assembly of gun 90, such as described in connection with FIG. 1, for example. It will be seen that grooves 152 and 154 have been placed in stopper 142 so that even when trigger 94 is not depressed and biasing means 144 forces stopper 142 into the orifice between cavities 148 and 150, gas can still flow therebetween through such grooves. The two grooves depicted at FIG. 4 are merely representative of a number which may be greater or lesser than that shown. Thus, when gun 90 is idle and the heated purge flow via line 108 passes into cavity 148 via line 106, it will pass via grooves 152 and 154 into cavity 150 and thence along the amine flow path within gun 90 for maintaining a desired temperature therein and for purging any condensed amine therein.

Figure 5:
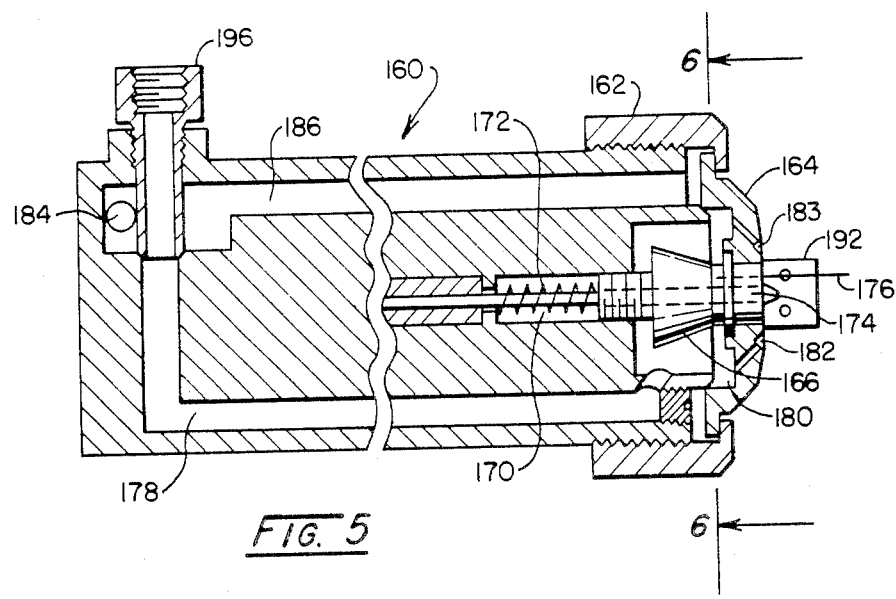
FIG. 5 is a partial cross-sectional view through the barrel of another electrostatic spray gun.
Figure 6:
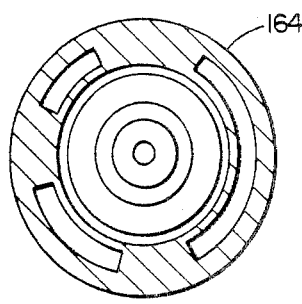
FIG. 6 is a sectional view of the air cap taken along line 6—6 of FIG. 5.

A final spray gun design which needs to be specifically addressed for implementing the novel heated gas purge technique of the present invention is known as an air-assisted airless electrostatic spray gun which is manufactured under one or more of the following U.S. Pat. Nos. 4,241,880, 4,335,851, 4,290,091, 4,219,865, 4,386,739, 3,8483,502, 4,462,061, and 4,497,447. An example of such spray gun is a Model PRO AA5000 as manufactured by Graco, Inc. (Minneapolis, Minn.). A partial crosssection elevational view of such an air-assisted airless electrostatic spray gun is set forth at FIGS. 5-7. In simple terms, such an electrostatic spray gun operates by atomizing the paint by a combination of two techniques. One technique is hydraulically pumping the paint through an orifice while the second technique is atomizing air. A second flow of fan air is used to shape the spray pattern, thus the name air-assisted airless electrostatic spraying. Referring specifically to FIG. 5, barrel 160 of the spray gun (not fully shown) is shown at its two respective ends with the middle not illustrated. The delivery end of barrel 160 is composed of retaining nut 162 which retains air cap 164 (see FIGS. 6 and 7), and spray tip assembly 166. Paint is delivered via a port (not shown) into chamber 170 which has spring 172 disposed therein wherein an external pump in the paint line hydraulically pressurizes the paint through orifice 174 of spray tip assembly 166. Electrostatic needle 176 provides a charge to the spray pattern of atomized paint exiting orifice 174 and is in electrical connection through barrel 160 by means not illustrated. Fan air supplied via channel 178 and flows into compartment 180 and out passageways 182 and 183 adjacent orifice 174.

Figure 7:
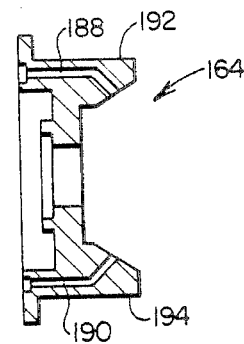
FIG. 7 is another cross-sectional view of the air cap of the gun in FIG. 5.

Atomizing air enters the gun via port 184 and flows via channel 186 to passages 188 and 190 located in horns 192 and 194, respectively, of air cap 164, as illustrated specifically in FIG. 7. From FIG. 5 it will be seen that a pair of passageways actually is provided in each horn 192 and 194, only one passageway being illustrated specifically in FIG. 7. This atomizing flow of gas provides a second and distinct means for atomizing the paint in addition to the hydraulic mechanism described above.

In conventional operation, the fan air and atomizing air intermix at the intersection of channels 178 and 186 since air is fed via both the fan air and the atomizing air delivery systems. In the spray catalyst adaptation for the electrostatic spray gun illustrated at FIG. 5, vaporous tertiary amine catalyst borne by a carrier gas can be passed through both the fan air and the atomizing air delivery systems. Should any amine condense in chamber 180, contact with the electrical delivery line to needle 176 may occur with consequent possible shorting out of the electrostatic gun. Accordingly, the present invention preferably utilizes plug 196 which is screwed into channel 178 and separates the fan air from the atomizing air throughout their respective flow paths in barrel 160. Now, the vaporous amine catalyst can be provided separately through the fan air flow path or through the atomizing air path as is necessary, desirable, or convenient since the spray catalyst method operates effectively with the vaporous amine catalyst supplied by either flow path. For minimizing possible contact of amine condensate with the electrical flow path to needle 176, it is preferred that the amine be supplied strictly through the atomizing air flow path which then becomes the amine flow path in barrel 160 of the electrostatic gun. The fan air flow path then can have heated air supplied thereto continuously whether or not the gun is spraying or is idle for insuring that the gun is maintained at a desirable high temperature adequate for preventing amine condensate from remaining in the gun when the gun is idle, and for suppressing the propensity for amine to condense in a cold gun which has been idle for a period of time. Of course, use of the purge air control schemes of FIGS. 2 or 3 could be applied to the amine flow path in barrel 160 additionally or in lieu of continuously supplying heated purge air through the fan air flow path.

In the preferred operation of this embodiment of the invention, however, the vaporous amine and the fan air flows both are controlled by pressure regulation means (not shown in the drawings) which ensure that the pressure in the fan air flow is always maintained at a higher pressure than the atomizing gas, i.e. vaporous amine flow. This means that the amine in the amine flow path will not be able to penetrate into chamber 180 for contact with any electrical lines therein. Desirably also in order to minimize the interference and diluting effect of the fan air and maximize the catalyzing effect of the vaporous amine in the process, it may be desirable also to reduce the fan air flow and increase the atomizing amine gas flow. This can be accomplished by reducing the size of orifice 182 and 183 (see FIG. 5) in communication with the fan air flow path and increasing the orifice size of passages 188 and 190.

While any liquid can be delivered through the spray guns described herein, typical utilization of the spray gun is for application of coating compositions or paints onto substrates. In this regard, it will be appreciated that any vaporous phase catalyst which can condense in the catalyst flow path in the spray gun when the gun is idle can benefit by application of the purge technique of the present invention. Preferably, though, the coating composition will be one that can be catalyzed or activated in the presence of an amine. Suitable such coating compositions include the polymercapto/polyisocyanate coatings disclosed in commonly-assigned application Ser. No. 06/905,700, filed Sept. 9, 1986; and the polyol/polyisocyanate coating composition bearing a tin or bismuth catalyst complex as disclosed in commonly-assigned application Ser. No. 06/931,610, filed 11/17/86 (a continuation-in-part of application Ser. No. 06/844,810, filed Mar. 27, 1986). Additional coating compositions suitable for use in connection with the present invention include U.S. Pat. No. 3,409,579 which discloses a binder composition of a phenol-aldehyde resin (including resole, novolac, and resitole), which preferably is a benzylic ether or a polyether phenol resin. U.S. Pat. No. 3,676,392 discloses a resin composition in an organic solvent composed of a polyether phenol or a methylol-terminated phenolic (resole) resin. U.S. Pat. No. 3,429,848 discloses a composition like that in U.S. Pat. No. 3,409,579 with the addition of a silane thereto.

U.S. Pat. No. 3,789,044 discloses a polyepoxide resin capped with hydroxybenzoic acid. U.S. Pat. No. 3,822,226 discloses a curable composition of a phenol reacted with an unsaturated material selected from unsaturated fatty acids, oils, fatty acids esters, butadiene homopolymers, butadiene copolymers, alcohols, and acids. U.S. Pat. No. 3,836,491 discloses a similar hydroxy-functional polymer (e.g. polyester, acrylic, polyether, etc.) capped with hydroxybenzoic acid. British Pat. 1,369,351 discloses a hydroxy or epoxy compound which has been capped with diphenolic acid. British Pat. No. 1,351,881 modifies a polyhydroxy, polyepoxy, or polycarboxyl resin with the reaction product of a phenol and an aldehyde.

U.S. Pat. No. 2,967,117 discloses a polyhydroxy polyester while U.S. Pat. No. 4,267,239 reacts an alkyd resin with para-hydroxybenzoic acid. U.S. Pat. No. 4,298,658 proposes an alkyd resin modified with 2,6-dimethylol-p-cresol.

U.S. Pats. Nos. 4,343,839, 4,365,039 and 4,374,167 disclose polyester resin coatings especially adapted for flexible substrates. U.S. Pat. No. 4,374,181 discloses resins especially adapted for application to reaction injection molded (RIM) urethane parts. U.S. Pat. No. 4,331,782 discloses a hydroxybenzoic acid-epoxy adduct. U.S. Pat. No. 4,343,924 proposes a stabilized phenol-functional condensation product of a phenol-aldehyde reaction product. U.S. Pat. No. 4,366,193 proposes the use of 1,2-dihydroxybenzene or derivatives thereof in vapor permeation curable coatings. U.S. Pat. No. 4,368,222 discloses the uniqueness of utilizing vapor permeation curable coatings on surface-porous substrates of fibrous-reinforced molding compounds (e.g. SMC). Finally, U.S. Pat. No. 4,396,647 discloses the use of 2,3′4-trihydroxy diphenyl.

It will be appreciated that the precepts of the present invention can be implemented by a variety of techniques in addition to those explicitly described herein. In this application, all citations are expressly incorporated herein by reference.

We claim:

1. In a spray gun for spraying atomized liquid with the assistance of a vaporous amine flow supplied from an amine line connected to an amine flow path in said gun, the improvement which comprises:

pressure regulation means followed by unidirectional flow valve means interposed in said amine line;

adjustable reference pressure sensing control means connected with said amine line after said amine line pressure regulation means to sense the pressure in said amine line;

pressure regulation means disposed in a control gas flow line which line is connected with said sensing control means as the reference pressure and which control gas flow is withdrawn from said sensing control means so long as the reference pressure in said amine line is greater than the pressure in the control gas flow line into said sensing control means;

two-way pilot actuated valve means interposed in a heated gas flow line which is at a pressure greater than the pressure in said amine line when said gun is idle, said control gas flow withdrawn from said sensing control means being the pilot therefor, whereby said pilot valve means is open only when said pilot control gas flow has gas flow therethrough;

unidirectional gas flow means interposed in a heated gas flow line which runs from said pilot valve means to the amine line at a point after said amine line unidirectional flow valve means, the control gas pressure regulation means being adjusted so that the control gas pressure is greater than the pressure in said amine line when said gun is spraying and there is gas flow therein, but the control gas pressure is less than the pressure in said amine line when the spray gun is idle and the pressure in the amine line increases because there is no gas flow therein;

wherein said gun has been modified so that said heated gas flow still passes through said gun when said gun is idle.

2. The spray gun of claim 1 wherein said gas of said heated gas flow and said gas of said control gas comprise air.

3. The spray gun of claim 1 wherein said heated gas flow and said control gas flow are derived from the same gas flow.

4. The spray gun of claim 1 wherein said heated gas flow is at a temperature of between about 30° and 95° C.

5. The spray gun of claim 1 which comprises an electrostatic spray gun.

* * * * *